United States Patent [19]

Ziegler

[11] 3,869,256

[45] Mar. 4, 1975

[54] CONTINUOUS FLUID BED REACTOR FOR FISSIONABLE MATERIAL

[75] Inventor: Donald L. Ziegler, Arvada, Colo.

[73] Assignee: The United States of America as represented by the United States Atomic Energy Commission, Washington, D.C.

[22] Filed: Sept. 28, 1972

[21] Appl. No.: 293,177

[52] U.S. Cl. .................. 23/284, 23/260, 423/19, 423/251, 423/258
[51] Int. Cl. ..................... B01j 1/00, C01g 56/00
[58] Field of Search ............... 23/284, 284.3, 260; 423/19, 251, 258

[56] References Cited
UNITED STATES PATENTS
2,750,258  6/1956  Jukkola et al. ................. 23/284 X
2,941,862  6/1960  Cyr et al. ....................... 23/284 X
3,585,732  6/1971  Itahashi ......................... 165/104 X OTHER PUBLICATIONS
Anastasia et al.; "Oxidation–Fluorination of Uranium Dioxide Pellets in a Fluidized Bed," I & EC Process Design & Development, Vol. 4, No. 3, July 1965, pp. 338–344.

Primary Examiner—Joseph Scovronek
Assistant Examiner—Arnold Turk
Attorney, Agent, or Firm—John A. Horan; Dudley W. King; Ignacio Resendez

[57] ABSTRACT

Plutonium (Pu) purification and plutonium hexafluoride ($PuF_6$) formation are achieved on a continuous basis by feeding particulate material into one end of an elongated and horizontally disposed vessel having an upper section with generally converging side walls and a lower section with generally vertical side walls, compartmented throughout its length by transversely disposed baffles, so that particulate material flows through the vessel in vertical generally zigzag fashion, being fluidized by dispersing gas that enters the compartment from a lower narrow compartment and discharges through an upper widened compartment. Vaporous $PuF_6$ formed from a reaction between the dispersing gas and the particulate material discharges through the upper widened compartment and solid impurities discharge for collection through a port at a far or distal end of the elongated vessel.

1 Claim, 5 Drawing Figures

3,869,256

CONTINUOUS FLUID BED REACTOR FOR FISSIONABLE MATERIAL

BACKGROUND OF THE INVENTION

In the purifying of plutonium oxide ($PuO_2$) or plutonium tetrafluoride ($PuF_4$), a batch process is employed whereby Pu is separated from impurities by reacting fluorine with the $PuO_2$ or $PuF_4$ to form volatile $PuF_6$ and thereafter separating $PuF_6$ from the solid materials. Batch processing may not be a serious disadvantage provided the impurity content is not too large — i.e., not greater than about 10%, — because the time loss associated with charging and discharging material may not be excessive in comparsion with the total run time. If the impurity content is excessive — i.e., greater than about 10% — then batch processing may become a serious disadvantage since the production rate is limited by such things as fluorine gas flow area, allowable gas velocity, high degree of back mixing such that impurities remain in the fluidized bed while particulate feed material is being added decreasing the average concentration of reactive material in the bed, and adversely affecting the criticality safe dimensions of the reactor. These limitations make it impractical to employ a continuous feed and discharge, especially in the case where it is desirable to completely remove the impurities from the fissionable materials.

SUMMARY OF THE INVENTION

In view of the above limitations, it is an object of this invention to provide for continuously purifying Pu by volatilizing it in the form of $PuF_6$.

It is a further object of this invention to provide for recovering Pu whereby geometrical features prevent buildup of nuclear criticality concentrations.

It is a further object of this invention to provide a system to obviate a large number of individual reactors.

It is a further object of this invention to provide for increase in capacity by extending the length of the apparatus without nuclear criticality limitation.

Various other objects and advantages will appear from the following description of this invention and the most novel features will be particularly pointed out hereinafter in connection with the appended claims. It will be understood that various changes in the details, materials, and layout of the system and apparatus which are herein described and illustrated in order to explain the nature of the invention may be effected by those skilled in the art without departing from the scope of this invention.

The invention comprises, in brief, introducing $PuF_4$ or $PuO_2$ into a lower stage of an elongated vessel, the vessel having transversely extending baffles forming an array of compartments and a passageway between the input end and the distal end of the vessel, with alternating openings in consecutive or succeeding baffles to pass fluidized particulate materials in generally zigzag fashion, fluidizing being effected by introducing fluorine gas and an inert carrier gas at the lower part of the vessel and the gas fluidizing and reacting with Pu in the particulate matter in the lower reaction part or stage to form $PuF_6$, an upper recovery stage of increased volume in the vessel terminating the fluidizing, and a passageway above the baffles and upper section of the vessel serving for withdrawal of gases and an outlet at the discharge end of the vessel for discharging solids for collection.

DETAILED DESCRIPTION

Figure 1:
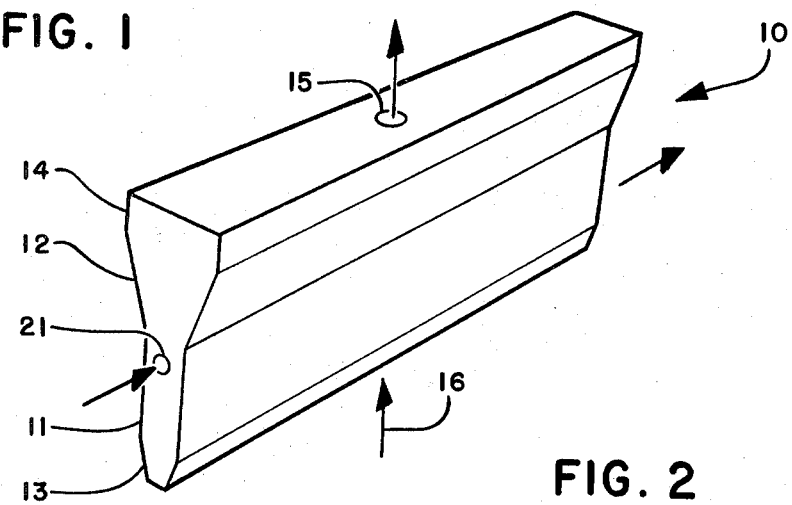
FIG. 1 represents a perspective view of one embodiment of this invention.
Figure 2:
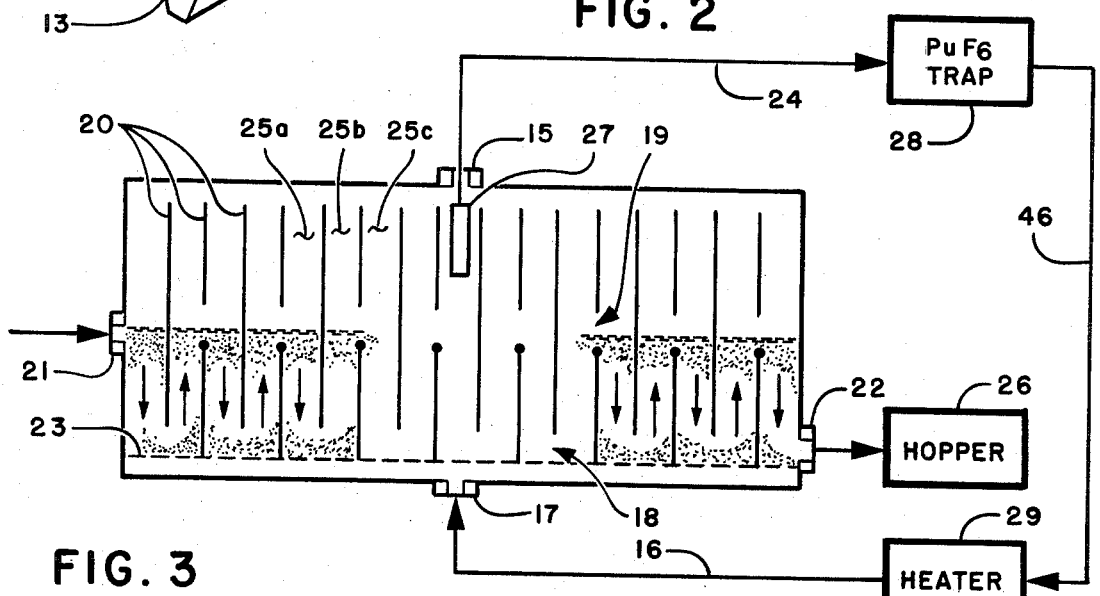
FIG. 2 represents a diagrammatic cutaway side view of an embodiment of this invention.

In the reactor vessel 10 shown in FIGS. 1 and 2, the vessel is provided with two main sections — a first or lower reaction section 11 and a second or upper portion recovery or disengaging section 12. Beneath the lower portion section 11 there is a gas inlet section 13 and above the upper portion section 12 is a gas removal section 14 leading or extending to gas removal port or means 15 after passing through a filter 27. As shown in FIG. 1 the upper or recovery section 12 is of a greater volume than lower reaction section 11 such that the incoming gas, fed through a conduit (shown by arrow 16) and gas input port or coupling 17, will be dispersed the length of gas inlet section 13 and thereafter be distributed in cross flow direction to the solid particulate flow the length of vessel 10 in the lower section 11 by means of gas dispersing means or perforated distributor plate 23 located at a junction or as a wall between lower section 11 and gas inlet section 13. The suitably preheated incoming gas which may be preheated by heater 29 which may be of any appropriate type such as an electrical resistance heater, will react with particulate solid material fed in at input port 21, forming $PuF_6$ in the volatile state. The particulate material may be of suitable size to be effectively fluidized and reacted with the gas and may typically range in size from about 50 microns to about 300 microns, and preferably from about 200 to about 300 microns. The volatilized $PuF_6$ gas will thereafter ascend or be forced through the upper section 12 and thereafter through gas removal section 14 and through appropriate filters 27 and gas removal port or coupling 15 to an appropriate collection and gas separation apparatus, such as a $PuF_6$ trap 28. Trap 28 selectively separates, by means well known in the art such as condensation temperatures differentials, $PuF_6$ from other gases.

Fluorine gas ($F_2$) and any suitable inert gas may be fed into heater 29 for preheating and thereafter may enter the bottom of the reactor through input means or port 17 passing through the distributor plate 23 in cross flow direction to the solid particulate flow to agitate and fluidize a bed of solids or solid particulate material fed into vessel 10 via port 21. In this and subsequent examples or illustrations, nitrogen or other suitable carrier gas inert to the reaction and materials may be introduced along with the fluorine as shown by the arrows to heater 29 to aid in supplying heat and to fluidize the particulate material. The gas velocity and volume of the preheated fluorine gas fluidizes the bed of solids and is preheated to a temperature sufficient to initiate the desired reaction. The temperature may range from about 300°C to about 600°C but preferably is between about 500°C and 550°C. In the alternative, suitable heating means (not shown) may be provided on the vessel 10 walls or appropriate heating conduits or piping within the vessel 10 to achieve required temperatures. The reaction product gases and excess input or feed gas will thereafter enter upper section 12 where a particulate fluidized bed will not form because of the expanded volume of the upper section 12 which results in insufficient gas velocity for fluidization of the solid particles. The reacted gases and excess fluorine gas will then be removed through gas removal section 14 through appropriate filters 27 and gas removal port 15 to other facilities such as gas separation condensation trap 28 which separates the product $PuF_6$ from other gases. Disposed within the generally horizontally elongated reaction vessel 10 is a plurality of generally vertical, transversely disposed, traversing baffles 20 extending from about the top portion of upper section 12 to, or near, the distribution plate 23 thereby separating the reactor vessel into an array or series of compartments (e.g., compartments 25a, 25b and 25c). As shown by the small arrows in FIG. 2 there is defined within or across the baffles a path or passageway for passage of particulate material from particulate material input means or port 21 in series through each of the compartments formed by baffles 20 via openings positioned alternately near the bottoms and central or mid-portions of the baffles, as shown. Although alternate baffles 20 are shown to contain an opening or passageway at about the upper level of the fluidized bed (i.e., — at generally upper level of section 11), it may be possible to provide alternate embodiments by deleting the upper portion of these alternate baffles such as to combine adjacent upper compartments (e.g., — compartments 25b and 25c). This deletion and combination may result in increased turbulence within the vessel but may still be satisfactory for Pu purification and $PuF_6$ production.

Since the solids in the reactor during fluidization act as a fluid, the solids will flow from the feed point under and over the lower portion of baffles 20 to the discharge point or port 22 to be collected in a suitable receptacle such as hopper 26. The passageways or openings of the baffles 20 may be located in alternate baffles such as an opening 18 between the baffle and the distribution plate 23 and secondly in subsequent or intermediate baffles in or near the general central or mid-part 19 of the baffle — which mid- or central portion or part 19 generally coincides with the upper level of the lower section 11 of the reactor vessel. The level of fluidized solids in the reactor should be approximately at the top of the central opening (openings 19) of each of the baffles where the solids must pass over. Above this point, the gas flow cross-sectional area (upper section 12) increases so that solids disengage from the exit or exhaust gas. Elutriated particles may be removed from the exhaust gas by means of a suitable filter 27. Each compartment of the reactor between baffles will act as a completely backmixed fluidized bed reactor. A backmixed fluidized bed is one in which the contents are well stirred and uniform in composition throughout. As the number of stages increases, the degree of segregation of the feed material from the reacted material is increased.

Figure 3:
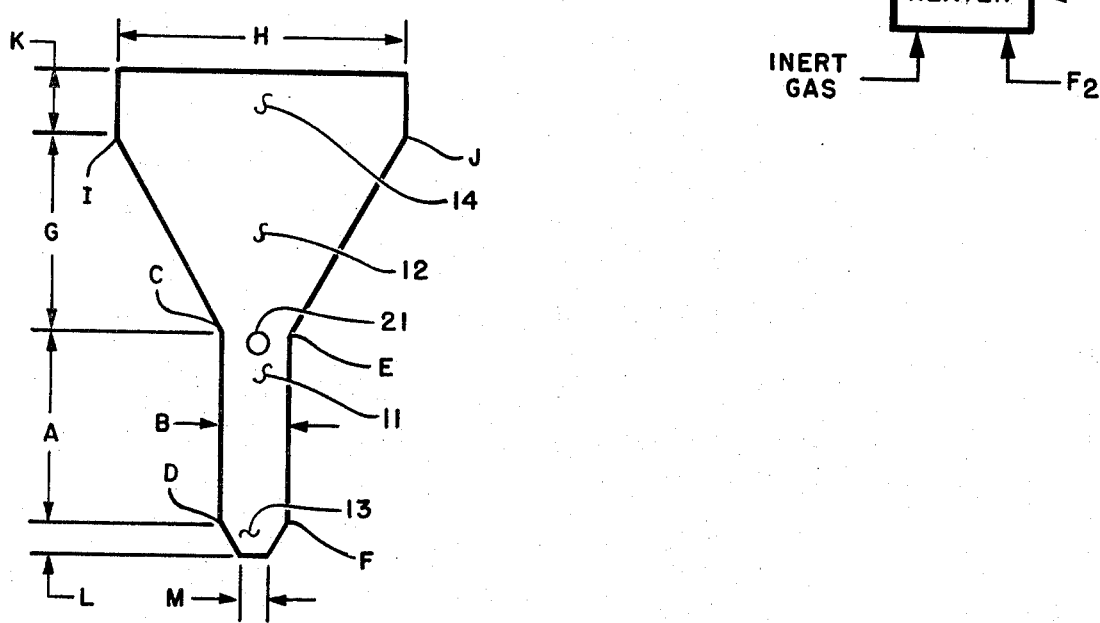
FIG. 3 represents a front end view of the reactor of FIG. 1.

FIG. 3 is an end view of a reactor whose horizontal cross-sectional area of a compartment meets the objectives of this invention. It is shown for illustration purposes only and is not intended to exclude other configurations and dimensions. The reaction bed section 11 height A may typically be approximately 6 inches; width B may typically be approximately 3 inches while sides CD and EF may be approximately vertical. There may be a distance of about 3 inches between baffles and the gas flow area may therefore be approximately 9 square inches. The disengaging section height G may typically measure approximately 6 inches and the width of the disengaging section may increase in a straight line from 3 inches at B to 9 inches at H resulting in a gas flow area increase to about 27 square inches due to the increase in width. The height K of the gas removal section 14 may typically be about 2 inches with the width H remaining the same 9 inches. The height L of the gas inlet section 13 may be about 2 inches converging from a width B of about 3 inches to a width M of about 1 inch. The diameter of the hopper 26 may be varied but may preferably be about 5 inches.

Figure 4:
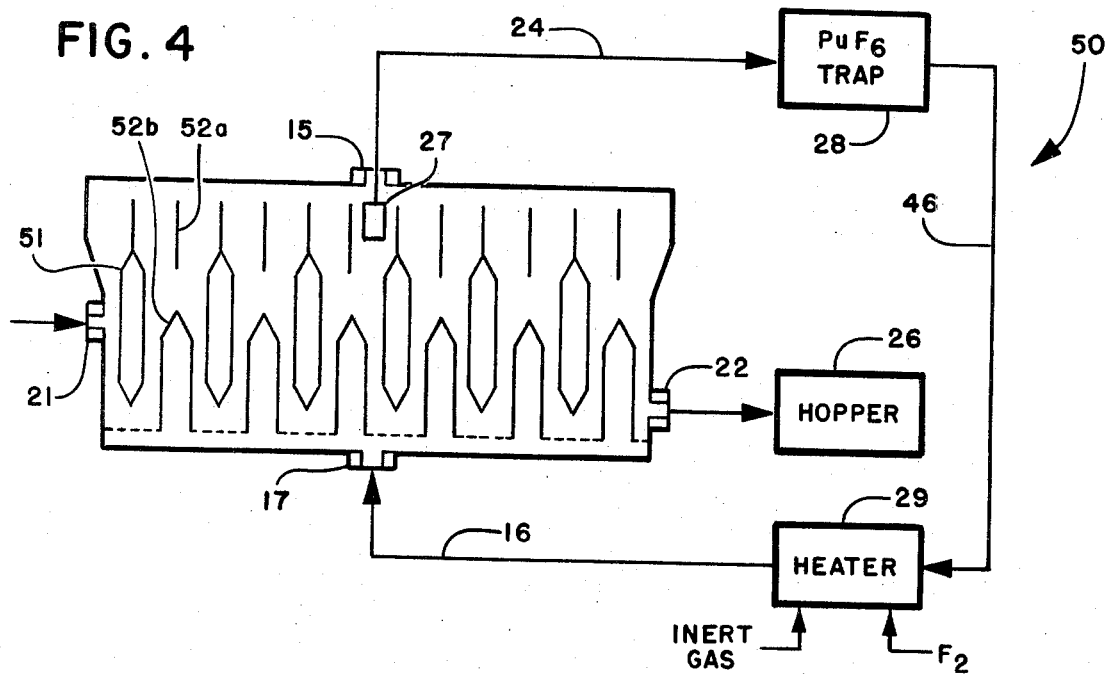
FIG. 4 represents a diagrammatic cutaway side view of another alternate embodiment of this invention.

Alternating the level of the passageway or opening within the baffles minimizes short circuiting (i.e., rush of light weight particles and congestion of heavy weight particles) of feed solids to be discharged as residue due to particle size segregation. If low weight particles or fines tend to collect at the top of each compartment and heavier or larger particles tend to collect at the bottom of each compartment, the larger particles transfer under a baffle quickly and the lighter material more slowly. But in the next compartment the fines transfer quickly over the baffle and the larger particles transfer slowly. The net result is that while particles may be said to be differently hindered in their movement towards the discharge end port 22, the overall flow rates for both small and large particles is approximately equalized. A further modification for larger criticality safety is shown in FIG. 4. The objective here is to decrease the average ultimate bulk density of the fluidized bed by insertion of void spaces in the reactor. This may be accomplished by employing hollow baffles in the reactor, such as baffles 51 and 52b shown in the alternate embodiment of reactor 50 of FIG. 4. The distance between baffles 51 and 52b amy be approximately 2 inches and the void space in the baffle may be about 2 inches, i.e., in one example. As shown in FIG. 4, the distance between baffles 51 and 52a will be greater than between 51 and 52b. This may give an average bulk density of about 50% of that in the embodiments of FIGS. 1 and 5. The end view area criticality limit for the lower reaction section can be increased because of the following relationship:

$$M = (\rho_o)/(\rho) \; 1.47 \; M_o \text{ or}$$

$$A = A_o(\rho_o)/(\rho) \; 1.47$$

The definitions of the above symbols are:
$M$ = Criticality mass limit (with void spaces)
$M_o$ = Original criticality mass limit (without void spaces)
$\rho_o$ = Original bulk density of solids
$\rho$ = Bulk density of solids (including void spaces)
$A$ = Allowable end view area (with void spaces)
$A_o$ = Allowable end view area (without void spaces)
The end view area (similar to that shown in FIG. 3 but for the reactor embodiment of FIG. 4) allowable with 50% voids would be about 54 square inches, and typical dimensions for such an end view area with reference to FIG. 3 would be: reaction section height A is 8 inches, disengaging section height G is 8 inches, reaction section width B is 5 inches, and the width of the disengaging section increasing in a straight line from width B of 5 inches to width H of 13 inches. The height K of the gas removal section may remain at 2 inches and height L of the gas inlet section remains at 2 inches. The equivalent end view area of the reaction section is about 50 square inches (10 inches high by 5 inches wide). These dimensions are given as typical and are not intended to be exclusive.

Figure 5:
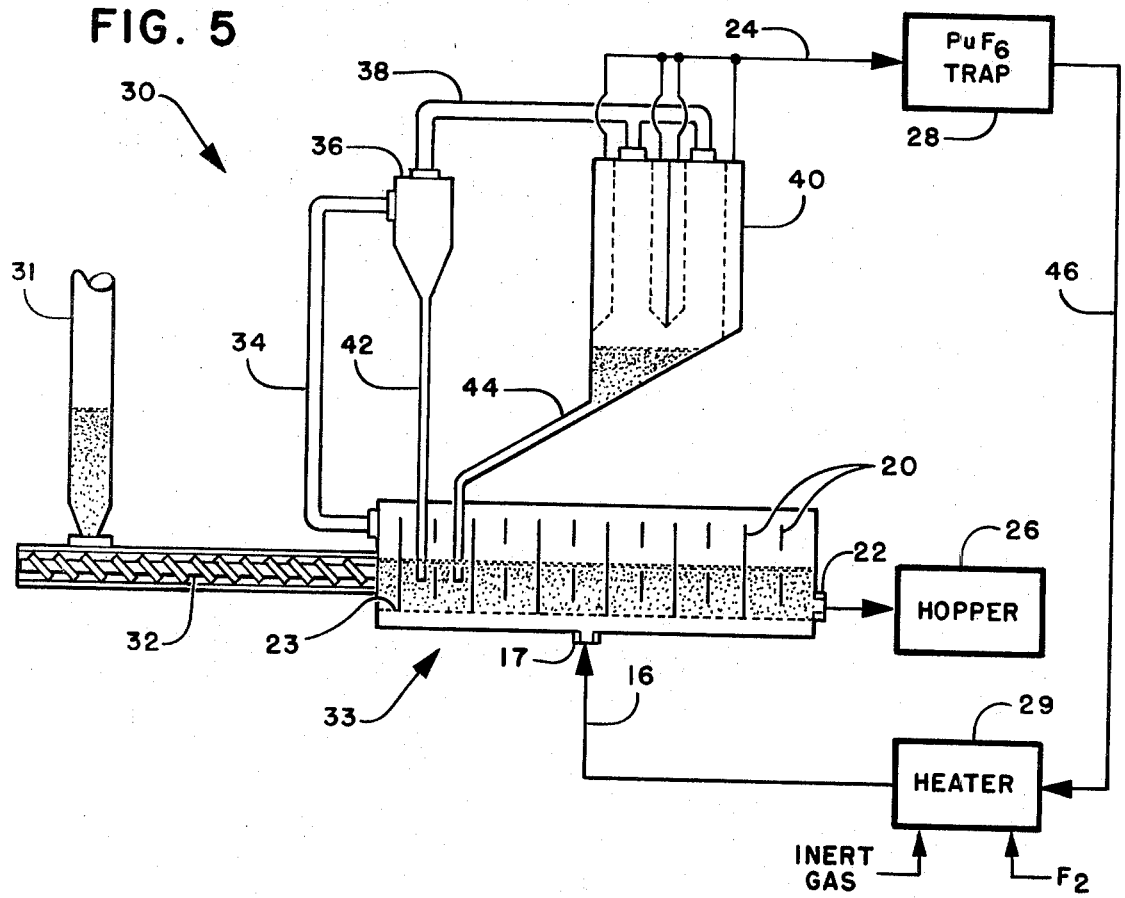
FIG. 5 represents a diagrammatic cutaway side view of an alternate embodiment of this invention.

FIG. 5 represents a more complete system 30 which is a modification of the embodiment of FIG. 1 and wherein the disengaging or upper section 12 is entirely substituted for by appropriate filters and traps. The system contains means for feeding in the particulate material, recovering the plutonium hexafluoride gas, returning solid material which was exhausted back to the fluidized bed, and also recycling both the excess fluorine and nitrogen gas through the fluid bed. If desired, the designer may employ hollow baffles as recited above and illustrated in FIG. 4. As shown in FIG. 5 a solids feed hopper 31 is used to load an appropriate drive or carrier worm gear 32 and thus feed particulate solids into reaction vessel 33. The input gas into the reaction vessel 33 comprises new fluorine and nitrogen as shown by arrows to heater 29 and also recycled nitrogen and fluorine as shown by arrow 46 to heater 29. The exhaust gas from vessel 33, after having reacted with the particulate feed material fed into vessel 33, is conducted to cyclone or gas particle separator 36 by means of conduit 34. The cyclone 36 or the like removes the majority of solid material prior to filtration. This in effect results in a decrease of solids load on any subsequent filtering operation and decreases the frequency of required flow back operations. The gases are conducted from cyclone 36 or the like to an appropriate filter means 40 by means of conduit 38. Appropriate filter media 40 allow passage of the nitrogen, fluorine and $PuF_6$ to traps (such as $PuF_6$ trap 28) but retain the particulate solid material and return it to vessel 33 by means of conduit 44. Solids removed by means of cyclone 36 may be returned to the fluidized bed by means of conduit 42. The nitrogen and excess fluorine or unreacted fluorine is thereafter recovered and recycled through appropriate conduit and valving as shown by arrow 46 into heater means 29.

In this invention various means may be used to control the gas flow to insure fluidization in each compartment. One method to accomplish this is automatic gas flow control based upon the pressure drop in each compartment. This requires multiple feed points to the distribution plate, which may be undesirable in some instances. A second method utilizes a pressure drop through the distributor plate to obtain the desired gas flow to the various compartments. That is, if fines or low weight material tend to collect in the latter compartments, i.e., compartments approaching the distal end, the pressure drop through the distributor plate in these compartments will be proportionately higher to decrease the flow in comparison to that in the other compartments. As long as the pressure drop through the distributor plate 23 is high in comparison to that of the bed the desired flow will be obtained in each compartment even if one is full of solids and another is empty. This would be the case during start of operations. In order to have the most efficient or optimum efficiency in gas flow as well as uniform gas flow within each compartment, the walls of the compartment should be near vertical. It may even be further desirable to have the gas flow area within each chamber increased from bottom to top to compensate for the expansion of gas volume due to temperature and pressure changes.

As previously stated, FIG. 5 is a modification of the reactor described in FIG. 1. In this modification the disengaging or upper section 12 is entirely removed or substituted therefor with appropriate equipment. This configuration or embodiment may be desired in order to provide another approach to criticality safety which may provide adequate protection. The dimensions for this reactor would be set by considering an infinite slab of plutonium tetrafluoride at the maximum density which the solids may be expected to achieve or attain. This density would determine end view cross-sectional area. For present criticality purposes it may be assumed that a 5 inch diameter infinite cylinder (19.6 inches square cross-sectional area) would be critically safe.

In comparing the designs (FIG. 2 design, FIG. 4 design and FIG. 5 design) the advantages of each should be noted. The FIG. 5 design eliminates the need to rely on instrumentation for criticality safety. Each vessel may be sized to be critically safe when filled with plutonium tetrafluoride at the maximum bulk density which could be expected. As to the FIG. 5 design, more residues are short circuited back to the feed end of the reactor than in the FIG. 2 design. In the FIG. 5 embodiments, the filter area can be increased without affecting the physical design limitation or configuration of the reactor vessel itself due to requirements of the upper recovery section 12. However, a higher load of solids on the filter requires a greater filtration area. The use of a cyclone, as stated earlier, minimizes this potential problem. The design of FIG. 4 allows the height and width of the reaction chamber to be increased and still remain within the criticality limitations. Because of the space occupied by the voids in the baffles, reactor length may be required to be about 33% longer to obtain the same gas flow area as in the FIG. 2 design. FIG. 4 modification, with instrumentation for criticality safety, provides increasing the area in the disengaging section, i.e., upper section 12 by expanding in two dimensions rather than just one. For comparison, the ratio of gas flow area in the disengaging section to that in the reaction section (for one compartment) is a factor of (27 square inches to 9 square inches) three for the FIG. 2 design and is a factor of (52 square inches to 10 square inches) 5.2 for the FIG. 4 design modification. Another advantage of the FIG. 4 modification is of using the baffles for additional heat transfers surfaces, i.e., in all of these reactions heat is required to effect reaction with the plutonium compound to form volatile $PuF_6$. The gas itself may be preheated to effect this reaction or the reactor surfaces may be used as heater surfaces. Hollow baffles present additional surface area to be used for this heating.

As the walls in the reaction section are not altogether vertical or near vertical in the FIG. 4 modification there is not as smooth a flow of gases within each compartment, as with FIG. 2. The reactor walls may be tapered to compensate for the change of gas flow area due to the taper on the bottom of the hollow baffles. A factor that affects choice of design to be used is such as the use of whether instrumentation can be relied on for criticality safety. If it may not be relied on, then the design of FIG. 5 may be preferred. Further, if the unit cannot be built within the limitation of the 18 square inch end view area, the hollow baffles discussed in modification of FIG. 4 may have to be used. In a typical end view of FIG. 4, there is a substantial increase in the overall height of the reactor as well as is the cross-sectional area of each chamber of the reactor as compared to a FIG. 2 reactor design. This increase in overall area is accounted for by the fact that the baffles having the void spaces in the reactor of FIG. 4 enable the use of greater cross-sectional area for gas travel before criticality safe limitations are reached.

Baffle thicknesses may vary from about one-sixteenth inch to about three-eighths inch in the solid design and from about 2 inches to about 4 inches in the hollow design. About three-sixteenths inch and about 3 inches thicknesses are desired in each design respectively.

In summary, a primary advantage to the continuous reactor of this invention is that the capacity of the reactor can be increased without serious criticality limitations simply by increasing the vessel length. Another important advantage is the fact that continuous production of plutonium hexafluoride can be effected. Since production rate is dependent on the amount of fluorine that can pass through the reactor in a given time, increasing the length of the reactor results in an increase in the gas flow area and therefore results in increased capacity. In a conventional design of a production prototype reactor, the gas enters the end of a cylinder. The diameter of the cylinder cannot be increased because of criticality limitations. This limits the gas flow area, thereby limiting the capacity of the unit. In the continuous reactor, the equipment utilization is to the fullest extent because the reactor operation occurs at the optimum bed depth. Because of the increased volume and the fact that reaction is continuous, one continuous reactor of this invention affords the capacity of several prior art batch type reactors and also the concurrent advantage of having fewer or requiring fewer automatic control loops, thereby lending itself more easily to remote operation. A further advantage of the continuous reactor of this invention is the subjection of equipment to fewer heating and cooling cycles than a batch reactor, making it easier to maintain tight seals to contain the hazardous fluorine gas and $PuF_6$. This contributes to less equipment corrosion because the protective coating on the reactor walls of batch type reactors may be damaged by the frequent temperature cycles. Although the equipment used herein may be fabricated of any suitable material, nickel may be preferred since a protective nickel fluoride coating is formed by passivation of the nickel surface reacting with fluorine gas.

As is noted in FIGS. 1, 3 and 5, the exhaust gas (shown by arrow 46) may be recycled to attain optimum efficiency. It is further noted that designs of FIGS. 1, 3 and 5 may utilize a hopper 26 to catch unreacted particles and solid impurities, suitable heating means 29, and a suitable $PuF_6$ trap 28 having appropriate conduit 24 extending from the filters 27 to $PuF_6$ trap 28.

What is claimed is:

1. A fluidized bed reactor system for continuously purifying plutonium feed materials and producing plutonium hexafluoride while maintaining a criticality safe condition at all times comprising:
   a. a generally horizontally disposed elongated vessel having an inlet port for solid particulate plutonium feed material at one end and an outlet port at a distal and lower end for removal of unreacted particulate feed material, said vessel having a closed top and closed bottom and including
      i. a lower reaction portion with generally parallel side walls, said lower reaction portion having a criticality safe essentially rectangular cross section of not greater than about 19.6 square inches taken in end view; and
      ii. an upper recovery portion communicating with said reaction portion and of greater width and volume than said reaction portion having oppositely disposed side walls diverging outwardly from the parallel side walls of said reaction vessel;
   b. distributor plate means within said vessel located beneath said reaction portion for feeding fluidizing fluorine gas and an inert carrier gas;
   c. means for removing plutonium hexafluoride gas from said recovery portion;
   d. a first plurality of spaced apart baffles disposed within said vessel and having upper and lower edges and spaced from said distribution plate means and said vessel top; and
   e. a second plurality of spaced apart baffles intermediate said first plurality of baffles having upper and lower edges and disposed within said vessel, said second plurality of baffles having their lower edges in contact with said distribution plate and said upper edges spaced from the top of said vessel, and each of said second plurality of baffles having an aperture adjacent the juncture of said divergent side walls of said recovery portion with said parallel side walls of said reaction portion to form a continuous passageway for passage of solid particulate feed material in a generally serpentine fashion through the vessel from said inlet port to said outlet port.

* * * * *